United States Patent [19]
Murray, Jr. et al.

[11] 4,409,441
[45] Oct. 11, 1983

[54] ULTRASONIC TRANSDUCER FOR USE IN A VIBRATORY ENVIRONMENT

[75] Inventors: Joseph E. Murray, Jr., Malden; Paul J. Sylvester, Reading, both of Mass.

[73] Assignee: Polaroid Corporation, Cambridge, Mass.

[21] Appl. No.: 279,722

[22] Filed: Jul. 2, 1981

[51] Int. Cl.³ .............................................. H04R 19/00
[52] U.S. Cl. ............................ 179/111 R; 179/111 E; 179/180
[58] Field of Search ................ 179/111 R, 111 E, 180

[56] References Cited
U.S. PATENT DOCUMENTS 2,581,063  1/1952  Alexander ...................... 179/111 R
3,814,864  6/1974  Victoreen ...................... 179/111 R
4,085,297  4/1978  Paglia ............................ 179/111 R Primary Examiner—G. Z. Rubinson
Assistant Examiner—Danita R. Byrd
Attorney, Agent, or Firm—John J. Kelleher

[57] ABSTRACT

A capacitance-type electrostatic transducer is provided that can be operated in an environment where it may be subjected to excessive mechanical vibrations. Unwanted gain variations and/or spurious electrical signals produced by said transducer when operated in such an environment are precluded by preventing relative movement between the spring that urges the backplate into cooperative engagement with the vibratile diaphragm of the transducer and said transducer backplate, at the point of contact between said spring and said backplate.

9 Claims, 8 Drawing Figures

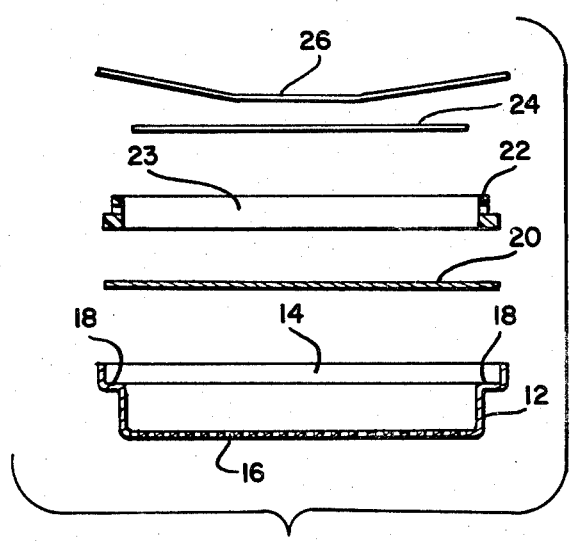
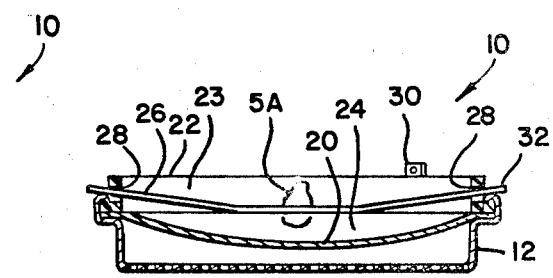
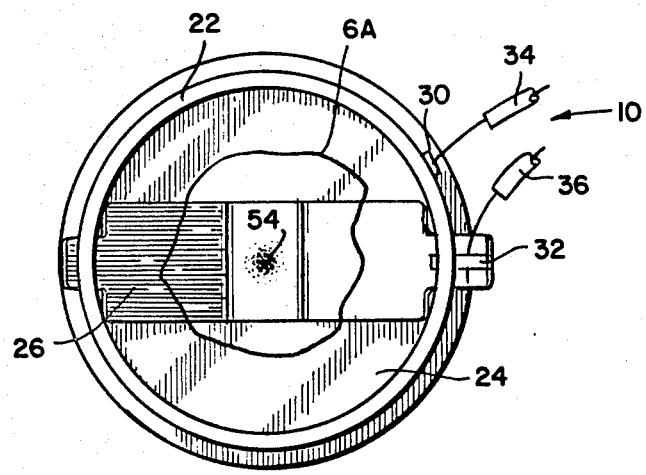
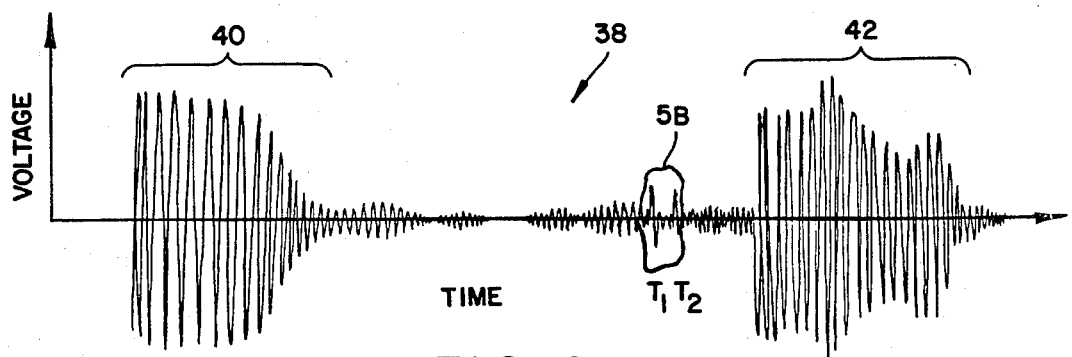

ULTRASONIC TRANSDUCER FOR USE IN A VIBRATORY ENVIRONMENT

BACKGROUND OF THE INVENTION

1. Field of the Invention

The present invention relates to an electroacoustical transducer assembly, in general, and to the apparatus for urging a backplate into cooperative engagement with a vibratile diaphragm in such a transducer, in particular.

2. Description of the Prior Art

Capacitance-type electroacoustical transducers are well known in the prior art. In such transducers, a diaphragm having an insulative layer and an electrically conductive surface has its insulative layer in contact with a grooved, irregular, electrically conductive surface of a substantially inflexible disc or backplate. The periphery of the diaphragm is maintained in a fixed position with respect to the transducer housing and a spring force urges said backplate into tensioning engagement with said diahpragm. The insulative layer, the electrically conductive surface of said diaphragm constituting a first electrode, and the conductive surface of said backplate constituting a second electrode, form a capacitor such that when a dc bias voltage is applied across said electrodes, irregularities in said backplate surface set up localized concentrated electric fields in said insulative layer. When an ac signal is superimposed on said dc bias, the diaphragm is stressed such that oscillatory formations develop causing an acoustical wavefront to be propagated from said diaphragm. A received acoustical wavefront impinging on the diaphragm produces a variable voltage across said capacitor electrodes.

In apparatus employing a transducer of the type mentioned above to measure object distance, such as the autofocus camera sold by Polaroid Corporation under its registered trademark SX-70 Sonar One Step!, the distance to the subject to be photographed is determined by the well-known technique of measuring the round-trip time-of-flight of a burst of ultrasonic energy between the ultrasonic energy generating transducer and said subject to be photographed. This type of transducer has both transmitting and receiving modes of operation. In the transmit mode, an electronic device causes the transducer to transmit a burst of ultrasonic energy toward a subject. In the receive mode, this same transducer detects ultrasonic energy reflected from said subject impinging on said transducer's vibratile diaphragm. The elapsed time from initiation of energy transmission until receipt of an echo of said transmitted energy is a fairly accurate measure of subject distance.

In a capacitance-type ultrasonic transducer such as that described in U.S. Pat. No. 4,085,297 to PAGLIA, an electrically conductive spring member is employed to urge the backplate of a transducer into cooperative engagement with the vibratile diaphragm of said transducer. In addition to its force producing function, the spring member also forms a part of the electrical circuit or path that electrically couples the transducer to electronic circuitry external of said transducer.

If such a capcitance-type transducer is operated in an environment where it is subjected to excessive mechanical vibrations after it has transmitted an ultrasonic burst of energy toward, for example, an object whose distance is to be measured while said transducer is in its receive mode waiting for the receipt of an echo of said ultrasonic burst of energy from said object, when said excessive vibrations are present, a spurious object detect signal may be generated by the transducer if the intensity of the vibrations are sufficient to temporarily separate the electrically conductive signal carrying spring member from its associated backplate. In addition, such vibration may also causes a slight lateral movement of the spring member with respect to its associated backplate and cause a change in the amount of tensioning of the vibratile diaphragm produced by said spring member, thereby causing a change in the effective gain or amplification associated with said capacitance-type transducer by such relative spring member movement.

SUMMARY OF THE INVENTION

In accordance with the teachings of the present invention, a capacitance-type electroacoustical transducer is provided that is capable of satisfactorily operating in an excessively vibratory environment. The transducer includes a vibratile diaphragm, a backplate and a spring for electrically connecting said backplate to an external electrical circuit and for urging said backplate into proper cooperative engagement with said diaphragm. Means are provided for fixedly attaching a portion of the spring to the backplate in order to preclude spurious transducer signal generation and/or undesirable change in transducer gain that might otherwise occur if spring movement relative to said backplate was not so precluded.

BRIEF DESCRIPTION OF THE DRAWINGS

FIG. 1 is an exploded elevational view, partly in section, of the electroacoustical transducer of the present invention.

FIG. 2 is an elevational view, partly in section, of the transducer of FIG. 1, fully assembled.

FIG. 3 is a top view of the fully assembled transducer of FIG. 2.

FIG. 4 is a typical trace of a transmit and receive signal appearing at the input/output terminals of the transducer of FIG. 2, showing signal voltage as a function of time.

DESCRIPTION OF THE PREFERRED EMBODIMENTS

Figure 5A:
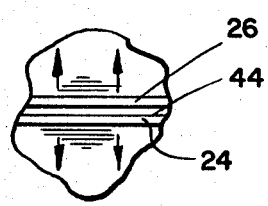
FIG. 5A is an enlargement of detail 5A in FIG. 2.

Referring now to the drawings and specifically to FIG. 1, an electroacoustical transducer 10 constructed in accordance with the teachings of the present invention is depicted. Transducer 10 includes cylindrical electrically conductive housing 12 having open end 14 at one end and partially closed perforated end 16 at the other. Electrically conductive housing 12 also includes flanged portion 18 near open end 14 of said housing 12. Flat vibratile diaphragm 20, having electrically conductive and electrically nonconductive surfaces on opposite sides thereof, extends across opening 14 and is positioned between diaphragm support ring 22 and said housing 12 with its said electrically conductive surface adjacent said opening 14. Diaphragm 20 is made from a polyimide film sold by the E. I. duPont deNemours &

Company, Inc. under its registered trademark KAP-TON. One surface of diaphragm 20 is electrically conductive in that it is coated with a thin layer of gold and the other surface is electrically nonconductive KAPTON. Diaphragm support ring 22 is of circular cross section with an opening 23 through the center thereof and has a flanged end for cooperative engagement with flanged portion 18 of housing 12. Aluminum backplate 24, of circular cross section, having electrically conductive external surfaces, includes a grooved and crowned electrically conductive surface for cooperative engagement with the nonconductive (KAPTON) surface of diaphragm 20. Leaf spring 26 provides the force that maintains backplate 26 in proper cooperative engagement with diaphragm 20. When fully assembled, the transducer components described in FIG. 1 are in the positions shown in FIGS. 2 and 3.

The transducer of FIGS. 2 and 3 is assembled by placing a light, uniform, radial force on diaphragm 20 for the purpose of temporarily maintaining said diaphragm in a relatively flat plane and then positioning said diaphragm over opening 14 (FIG. 1) of housing 12. Diaphragm 20 is then "dished" or formed into the shape of a subsequently mating backplate member. The periphery of said diaphragm 20 is then sandwiched between the flanged end of ring 22 and flange portion 18 of housing 12, and then the open end of housing 12 is clamped onto said ring 22 which places the periphery of diaphragm 20 in a fixed position with respect to said housing 12 and the electrically conductive surface of diaphragm 20 in direct electrical contact with said electrically conductive housing 12. Crowned backplate 24 is placed in opening 23 of support ring 22 such that the crowned surface of said backplate 24 engages the nonconductive surface of diaphragm 20 which has already been "dished" or placed into the same shape as the crowned surface of said backplate 24. With backplate 24 so positioned, leaf spring 26 is inserted through openings 28 in support ring 22 such that the center portion of leaf spring 26 presses against backplate 24 and the ends of leaf spring 26 rest against the side walls in openings 28 of support ring 22. With leaf spring 26 so positioned, diaphragm 20 will be in proper cooperative engagement with the crowned surface of backplate 24 and said leaf spring 26 will be in electrical contact with the crowned and grooved surface of backplate 24 through the electrically conductive aluminum of said blackplate 24.

A capacitance-type electroacoustical transducer of the type described above is often employed in object distance determining ranging systems. One such system is described in U.S. Pat. No. 4,199,246 to MUGGLI. In operation, a high frequency electrical signal is impressed on terminals 30, 32 of transducer 10 through conductors 34, 36, respectively, which causes the diaphragm of transducer 10 to vibrate and thereby propagate an acoustical wavefront toward an object whose distance is to be measured. An echo of said acoustical wavefront impinging on transducer 10 will cause diaphragm 20 of transducer 10 to vibrate and thereby produce an object detect signal between said electrical terminals 30, 32. The time of flight of said acoustical wavefront or signal from transmission to receipt of an echo of said acoustical signal provides a fairly good measure of object distance. Both the acoustical wavefront generating transmit signal and the vibrating diaphragm produced echo signal appear at the same transducer 10 terminal (terminals 30, 32) but at different points in time.

A typical transducer 10 transmit and receive signal 38 is shown in drawing FIG. 4. In FIG. 4, voltage variations of transmit and receive signal 38 are shown as a function of time. Signal 38 has three fairly distinct time-dependent divisions or segments. Segment 40 constitutes the transmit portion and segment 42 constitutes the receive portion, respectively, of transmit and receive signal 38. That portion of transmit and receive signal 38 between transmit portion 40 and receive portion 42 constitutes background, electronic and/or other noise present on transducer 10 terminals 30, 32 after the completion of transmit portion 40 of transmit and receive signal 38, but before the receipt of receive portion 42 of said signal 38. It is during this noise portion of transmit and receive signal 38 that the electronics associated with transducer 10 is listening for a reflection, echo or receipt of a previously transmitted transmit signal. If a spurious signal of sufficient magnitude and duration should appear between terminals 30, 32 of transducer 10 during this listening interval of time, an erroneous object distance signal may be generated by a ranging system incorporating such a transducer.

As explained above with respect to FIGS. 2 and 3, leaf spring 26 of transducer 10 forms a portion of the electrical circuit between external conductor 36 and the grooved and crowned electrically conductive surface of backplate 24. The electrical connection between leaf spring 26 and backplate 24 is maintained by the spring force of spring 24 causing said spring 24 to press on an electrically conductive surface of backplate 24 that is electrically connected to said grooved and crowned electrically conductive surface of backplate 24.

Figure 5B:
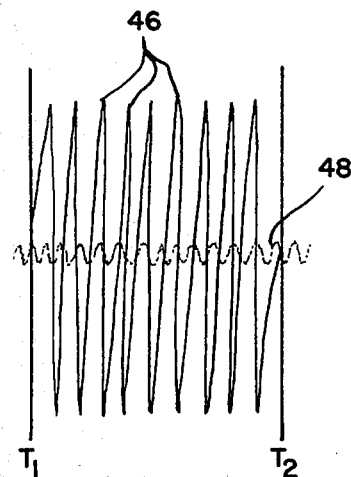
FIG. 5B is an enlargement of detail 5B in FIG. 4.

If transducer 10 is subjected to mechanical vibrations of sufficient magnitude (as schematically shown in FIG. 5A, which is an enlargement of detail 5A in FIG. 2), the forces produced by such vibrations may exceed the electrical contact maintaining force produced by leaf spring 26 and thereby cause a separation of said leaf spring 26 from backplate 24 and a momentary break in the electrical circuit between terminal 32 (FIG. 3) of leaf spring 26 and the electrically conductive grooved and crowned surface of said backplate 24. If this momentary electrical circuit break should occur between times $T_1$ and $T_2$ (FIGS. 4 and 5B) after completion of the transmit signal 40 portion of transmit and receive signal 38, but before the receipt of receive signal portion 42 of said signal 38 as shown, for example, in drawing FIG. 4, an erroneous object distance signal would be produced by the electronics (not shown) associated with said transducer 10. As shown in FIG. 5A, when transducer 10 is subjected to excessive mechanical vibrations, leaf spring 26 may temporarily move away from electrically conductive surface 44 of backplate 24. The effect of such movement is shown in FIG. 5B which is an enlargement of detail 5B in FIG. 4.

In FIGS. 4 and 5A, $T_1$ is the point in time when the electrical connection is broken between leaf spring 26 and backplate 24, and $T_2$ is the point in time when said broken electrical connection between spring 26 and backplate 24 is reestablished. With particular reference to FIGS. 5A and 5B, when spring 26 separates from surface 44 of backplate 24, voltage oscillations 46 may be generated by such separation having a magnitude approximating that of a true echo or receive signal which could falsely indicate to the said electronics associated with transducer 10 that a particular object had been detected, a false signal magnitude that may be several orders of magnitude greater than background noise 48, for example, noise that would otherwise occur between time $T_1$ and $T_2$ if the separation of leaf spring 26 from backplate 24 did not occur.

Figure 6A:
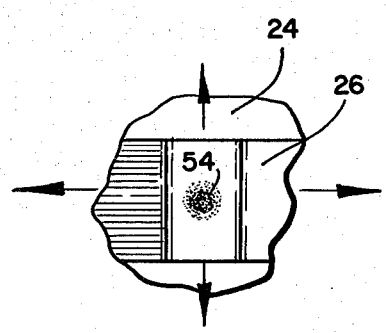
FIG. 6A is the detail 6A portion of FIG. 3.
Figure 6B:
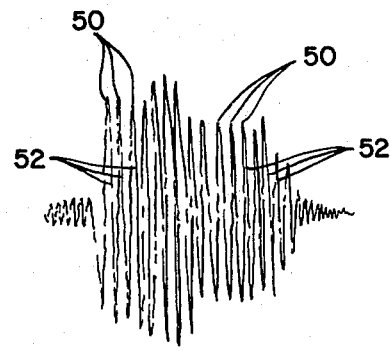
FIG. 6B is a trace of the receive signal portion of the transmit and receive signal of FIG. 4 showing two receive signal gain levels.

In addition to temporarily breaking the electrical connection between leaf spring 26 and backplate 24, excessive mechanical vibrations may cause lateral movement of said spring 26 with respect to said backplate 24. Such lateral movement is schematically depicted in drawing FIG. 6A which is detail 6A of the top view of transducer 10 illustrated in FIG. 3. Lateral movement of this type would change the point on backplate 24 where the spring 24 produced tensioning force is applied to said backplate 24 by said spring 26, which may change the tension on diaphragm 20 produced by diaphragm tensioning leaf spring 26, which may affect transducer 10 gain or the amplitude of an electrical signal produced between terminals 30, 32 resulting from an echo of an acoustical wavefront impinging on diaphragm 20 of transducer 10. As shown in FIG. 6B, a receive signal that might otherwise have the amplitude of receive signal 50 before lateral spring member movement occurred may have the lower amplitude of receive signal 52 after lateral spring member movement, or vice versa. The object distance determining electronics associated with transducer 10 is normally sensitive to receive signal amplitude and a change in receive signal amplitude resulting from such lateral spring member movement may also produce an erroneous object distance signal.

DISCUSSION

In order to prevent movement of leaf spring 26 either away from or laterally with respect to backplate 24 and thereby preclude the generation of the spurious signals and/or transducer gain variations described above, leaf spring 26 is fixedly attached to an electrically conductive surface of backplate 24 at the point of contact of said spring 26 with said backplate 24. One method of fixedly attaching leaf spring 26 to backplate 24 would be to weld these two members together. In this, the preferred embodiment, the spring is laser welded to the backplate 24 by laser weld 54 (FIGS. 3 and 6A) after the backplate and spring have been fully assembled on transducer 10. It is preferable that the material employed to fixedly attach spring 26 to backplate 24 enhance electrical conductivity between these two members, but it is not essential that such material be employed so long as the desired electrical resistance between said spring 26 and said backplate 24 can be achieved.

In addition to preventing movement of spring 26 with respect to backplate 24 at the point of contact between these two members, the same electrical resistance is maintained between spring 26 and backplate 24 by said laser weld 54.

The surface of metals such as aluminum or stainless steel from which backplate 24 and leaf spring 26 are respectively made will oxidize, to varying degrees, over extended periods of time. If transducer 10 was subjected to excessive mechanical vibrations as defined above, even while in an inactive state, without the benefit of said laser weld 54, movement of spring member 26 with respect to backplate 24 may cause a portion of an oxidized surface of one or both of these members to be included in the point of contact between the spring and backplate and thereby change the electrical resistance between these two members. The greater the electrical resistance between the spring and backplate, the greater, for example, will be the amount of signal voltage produced by the vibration of diaphragm 20 that is dropped across this increased resistance, and the smaller will be the amount of said signal voltage between terminals 30, 32 of transducer 10 that will be available for use in any distance determining electronics associated with said transducer 10 which may also cause said electronics to produce an erroneous object distance signal.

Spring 26 has been shown and described herein as an electrically conductive leaf spring. However, a conventional, electrically conductive coil spring may also be employed for diaphragm tensioning purposes and to provide the electrically conductive path from the transducer backplate to external circuitry. If such a coil spring were so employed, the end of the coil spring would normally be in contact with the transducer backplate, and it is this end that would be fixedly attached (preferably welded) to said backplate.

It will be apparent to those skilled in the art from the foregoing description of our invention that various improvements and modifications can be made in it without departing from its true scope. The embodiments described herein are merely illustrative and should not be viewed as the only embodiments that might encompass our invention.

What is claimed is:

1. An electroacoustical transducer assembly, comprising:
   a relatively inflexible backplate having an electrically conductive major surface and having another electrically conductive surface electrically connected to said major surface on the opposite side thereof;
   a relatively flexible diaphragm having electrically conductive and electrically nonconductive surfaces on opposite sides thereof; and
   an electrically conductive spring, having a portion thereof fixedly attached to said electrically conductive opposite-side backplate surface, for connecting said backplate to an electrical circuit, for urging said major backplate surface into engagement with said electrically nonconductive diaphragm surface and for properly tensioning said diaphragm.

2. The apparatus of claim 1, wherein said conductive spring is configured to provide an electrically conductive path to an electrical circuit external of said transducer.

3. The apparatus of claim 1, wherein said electrically conductive spring is a leaf spring and a center portion of said leaf spring is fixedly attached to said opposite-side backplate surface.

4. The apparatus of claim 1, wherein said electrically conductive spring is a conventional coil spring and an end of said coil spring is fixedly attached to said opposite-side backplate surface.

5. The apparatus of claims 3 or 4, wherein said electrically conductive spring is laser welded to said opposite-side backplate surface.

6. The apparatus of claim 1, wherein said backplate is constructed of aluminum and said spring is constructed of stainless steel.

7. The apparatus of claim 1, wherein said major backplate surface includes a plurality of concentric grooves.

8. The apparatus of claim 1, wherein said backplate is constructed of a plastic material with electrically conductive major and opposite-side surfaces that are electrically connected to one another.

9. In an electroacoustical transducer assembly comprising a relatively inflexible backplate having electrically conductive opposed major surfaces in common electrical connection, a flexible diaphragm extending across one of said major surfaces, an electrically conductive spring having one portion in engagement with the other of said major surfaces to urge said backplate into proper tensioning contact with said diaphragm and to provide electrical contact to said backplate, the improvement wherein said spring portion is fixedly attached to said backplate to provide a vibration resistant conductive path between said spring and said backplate.

* * * * *